US012645892B2

(12) United States Patent
Peng et al.

(10) Patent No.: US 12,645,892 B2
(45) Date of Patent: Jun. 2, 2026

(54) ADVANTAGE MODELING FOR RLHF

(71) Applicant: TENCENT AMERICA LLC, Palo Alto, CA (US)

(72) Inventors: Baolin Peng, Palo Alto, CA (US); Linfeng Song, Palo Alto, CA (US); Haitao Mi, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 266 days.

(21) Appl. No.: 18/490,100

(22) Filed: Oct. 19, 2023

(65) Prior Publication Data

US 2025/0131203 A1    Apr. 24, 2025

(51) Int. Cl.
*G06F 40/40* (2020.01)

(52) U.S. Cl.
CPC .................................... *G06F 40/40* (2020.01)

(58) Field of Classification Search
None
See application file for complete search history.

(56) References Cited

PUBLICATIONS

Liu, Jingbin, Xinyang Gu, and Shuai Liu. "Policy optimization reinforcement learning with entropy regularization." arXiv preprint arXiv:1912.01557 (2019). (Year: 2019).*
Zheng, Rui, et al. "Secrets of rlhf in large language models part i: Ppo." arXiv preprint arXiv:2307.04964 (2023). (Year: 2023).*
Wang, Shijun, et al. "Riemannian proximal policy optimization." arXiv preprint arXiv:2005.09195 (2020). (Year: 2020).*
Sun, Hao. "Reinforcement learning in the era of llms: What is essential? what is needed? an rl perspective on rlhf, prompting, and beyond." arXiv preprint arXiv:2310.06147 (2023). (Year: 2023).*
Long Ouyang et al., "Training language models to follow instructions with human feedback", arXiv:2203.02155v1 [cs.CL] Mar. 4, 2022, 68pages.
John Schulman et al., "Proximal Policy Optimization Algorithms", arXiv:1707.06347v2 [cs.LG] Aug. 28, 2017, 12pages.

* cited by examiner

*Primary Examiner* — Douglas Godbold
(74) *Attorney, Agent, or Firm* — Sughrue Mion, PLLC

(57) ABSTRACT

A method and apparatus comprising computer code configured to cause a processor or processors to receive an input question to the LLM, model an advantage for the input question based on at least one of a multi-gaussian mixed matrix (GMM) model and an entropy regularizer, and train the LLM based on the advantage, and the advantage includes a proximal policy optimization (PPO) objective where modeling the advantage is based on the multi-GMM model, and the advantage includes a combination of an output of a reward model (RM) and an average model performance for the input question where modeling the advantage is based on the entropy regularizer.

18 Claims, 6 Drawing Sheets

200

100

101

104

105

Network

103

102

200

201  Query

202

230  Prompts

220  Comparison Data

213  RLHF

214  Final Model

211  Ranking

212  Model

210  Initial LLM

203  Answer

Figure 6:
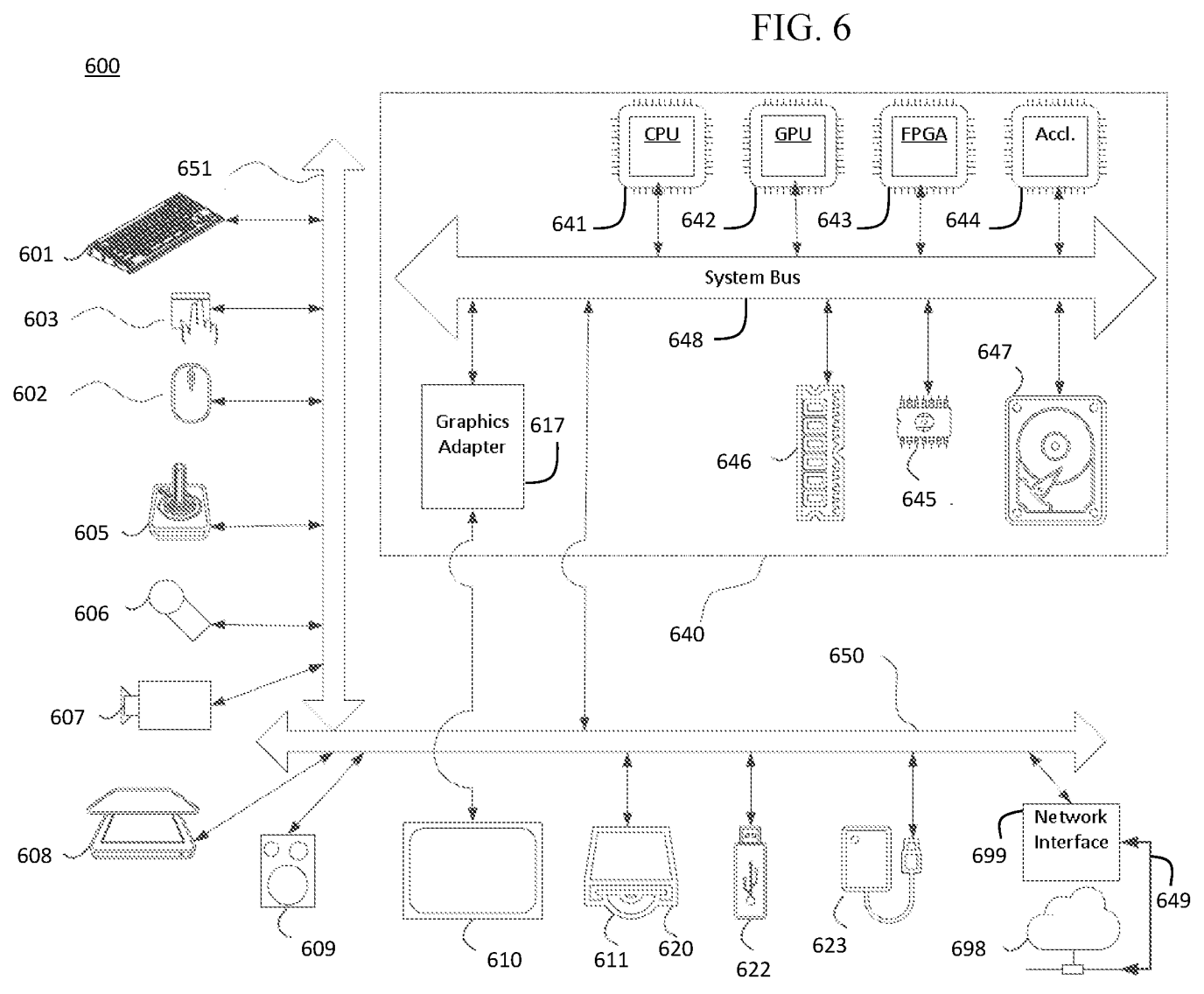

641 CPU
642 GPU
643 FPGA
644 Accl.

System Bus

648

646

645

647

617 Graphics Adapter

640

650

601
603
602
605
606
607
608
651
609
610
611
620
622
623
699 Network Interface
698
649

ADVANTAGE MODELING FOR RLHF

BACKGROUND

1. Field

The present disclosure is directed to advantage modeling for reinforcement learning from human feedback (RLHF).

2. Description of Related Art

Considering generative pre-trained transformer (GPT) technology, well-aligned large language models (LLMs) such as ChatGPT have attracted lots of attention all over the world. A key technique at hand is alignment, which is to align a pretrained LLM to perform human-assigned task (e.g., writing a story about a topic) using its knowledge during pretraining. The task of LLM alignment is challenging as what makes a "good" text is inherently hard to define as it can be subjective and context dependent. Previous work has used RLHF, a model training procedure that is applied to a fine-tuned language model to further align model behavior with human preferences and instruction following.

However, with that technology, since a ranking loss function may only focus on whether there is a difference, it results in huge gaps in scores between samples from different tasks. That is, there may be a significant difference between a reward model (RM) means of different categories. As such, there is a decrease in stability of a training process, and phenomenon, such as outputting or saying what should be said and over-outputting what should not be said, may occur.

And for any of those reasons there is therefore a desire for technical solutions to such problems that arose in computer technology.

SUMMARY

There is included a method and apparatus comprising memory configured to store computer program code and a processor or processors configured to access the computer program code and operate as instructed by the computer program code. The computer program is configured to cause the processor implement receiving code configured to cause the at least one hardware processor to receive an input question to the LLM, modeling code configured to cause the at least one hardware processor to model an advantage for the input question based on at least one of a multi-gaussian mixed matrix (GMM) model and an entropy regularizer, and training code configured to cause the at least one hardware processor to train the LLM based on the advantage, wherein the advantage comprises a proximal policy optimization (PPO) objective where modeling the advantage is based on the multi-GMM model, and wherein the advantage comprises a combination of an output of a reward model (RM) and an average model performance for the input question where modeling the advantage is based on the entropy regularizer.

According to exemplary embodiments, the combination of the output of the RM and the average model performance comprises a reduction of the output of the RM by the average model performance.

According to exemplary embodiments, the output of the reward model comprises $-\log(\sigma(a_\theta(x, y_c) - a_\theta(x, y_r)))$ where a is an action, $r_\theta(x, y)$ is an output of the RM for question x which is the input question, and y is a model output with parameter $\theta$, and $y_c$ is an output based on another output $y_r$.

According to exemplary embodiments, the average model performance is an average model performance for the question x.

According to exemplary embodiments, the combination further comprises, as the entropy regularizer, an entropy of the model output y as a reward to the reduction.

According to exemplary embodiments, the parameter $\theta$ represents a distribution from which a sample is taken in the multi-GMM model.

According to exemplary embodiments, the PPO objective is based on question and answer pairs, wherein at least one of the question and answer pairs comprises the input question.

According to exemplary embodiments, the multi-GMM model comprises sampling a distribution, a sentence embedding, and entropy each based on separate Gaussian distributions.

According to exemplary embodiments, the multi-GMM model sets importance of the entropy.

According to exemplary embodiments, the multi-GMM model samples the distribution, the sentence embedding, and the entropy in order of the distribution, then the sentence embedding, and then the entropy.

BRIEF DESCRIPTION OF THE DRAWINGS

Further features, nature, and various advantages of the disclosed subject matter will be more apparent from the following detailed description and the accompanying drawings in which:

FIG. 6 is a simplified illustration in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
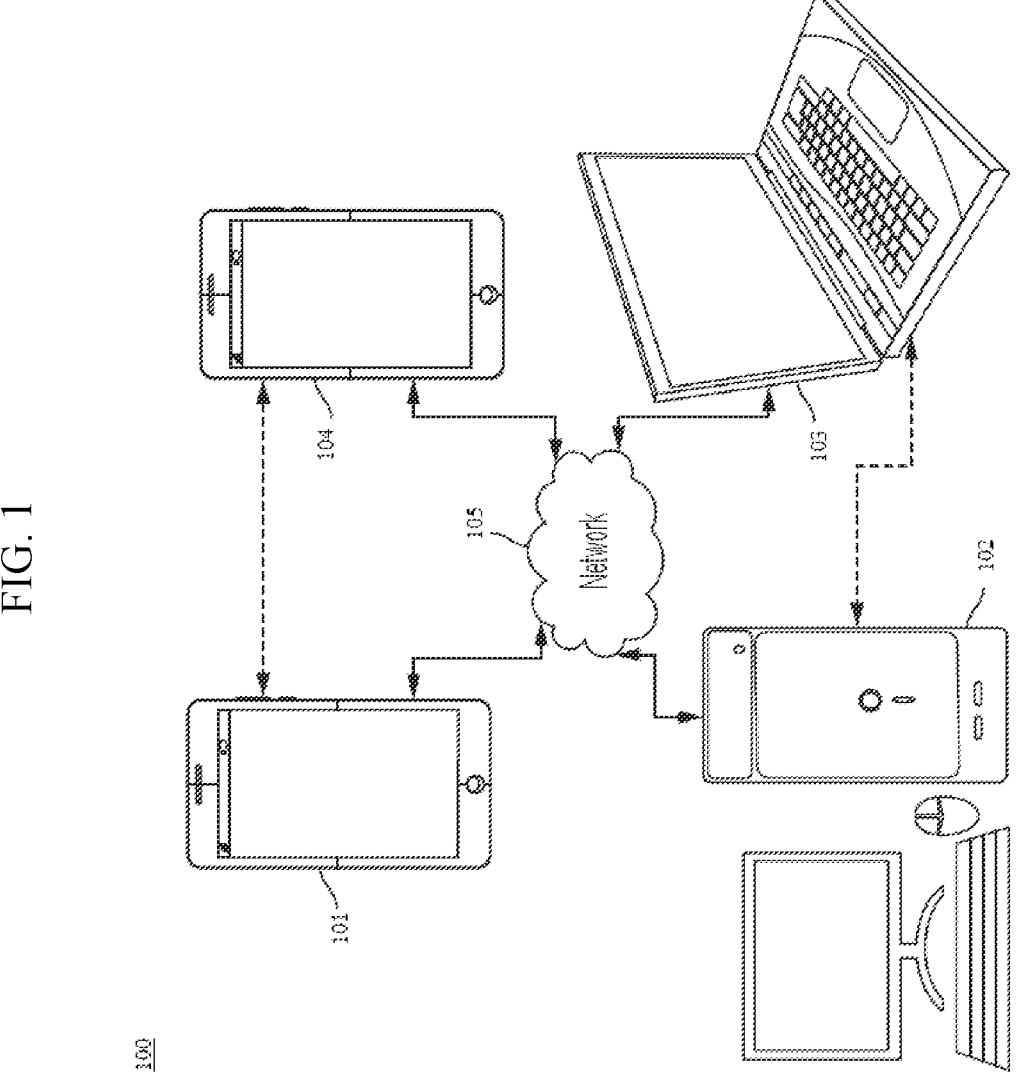
FIG. 1 is a schematic illustration of a diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
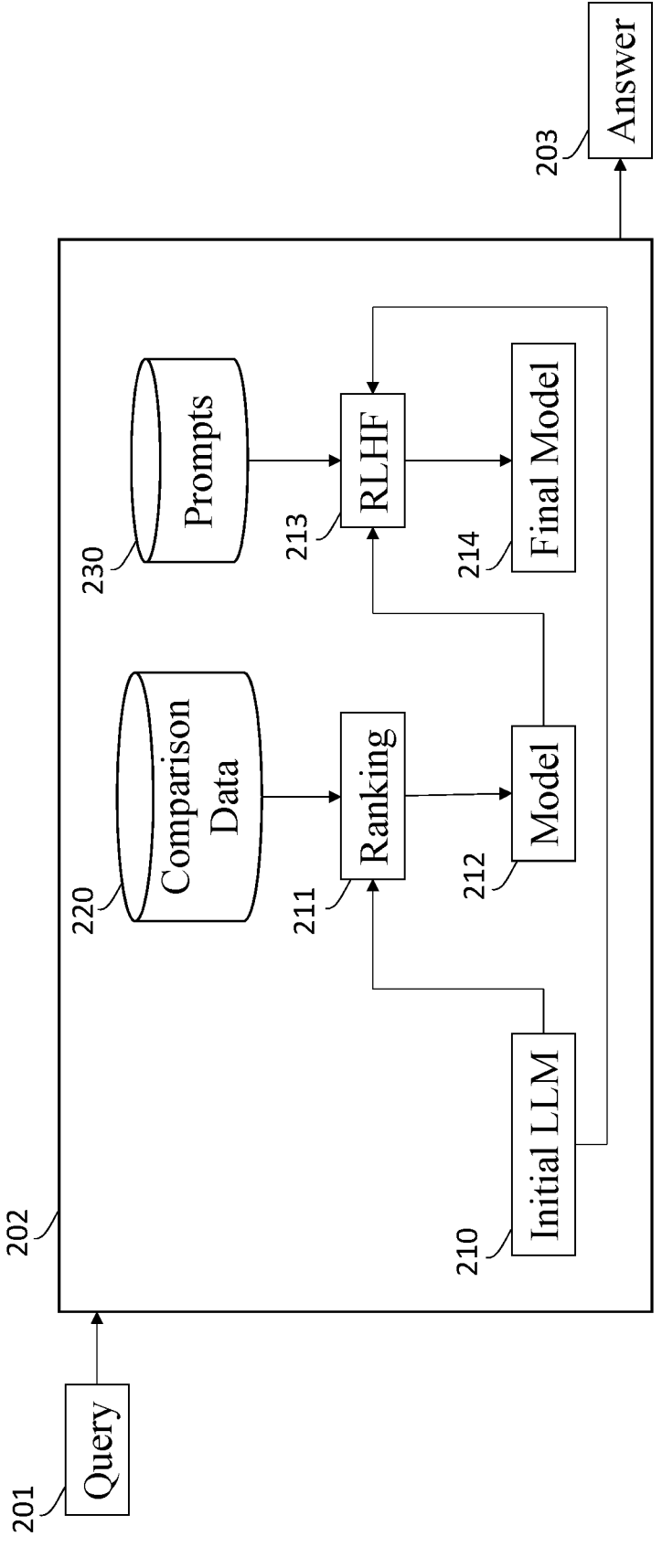
FIG. 2 is a simplified flow diagram in accordance with embodiments.

According to exemplary embodiments as shown in FIG. 2, an RLHF pipeline 200 may first train a model 212, which may be a reward model (RM) or an advantage model described further below, using standard ranking loss 211 on some comparison data 220. Each instance inside the comparison dataset, having the comparison data 220, usually contains several model outputs regarding a question, such as the query 201 to a GPT LLM or from the prompts 230, and the corresponding human-annotated ranking for the outputs, e.g., whether the human operator decided whether the answer 203 was appropriate or not. The RLHF pipeline 202 then uses the model 212 as the supervision to train the LLM to obtain the final model 213 for external use such as providing an answer 203 which could be output to a user in the form of a text, solution to a problem in the query 201, story, etc. Obviously, the model 212 serves as a critical role in the success of RLHF 213, having prompts 230 as input. The model 212 obtained by a ranking-loss training method can generally achieve quite satisfactory accuracy on the development set of reward modeling. However, if the ranking loss function only focuses on whether there is a difference, the function results in huge gaps in scores between samples from different tasks.

Accordingly, embodiments herein define the concept of "Proximal Policy Optimization (PPO) Alignment Tax" to describe a score-gap phenomenon, and it has been found by embodiments herein that Tax may be very unevenly paid (unfair) by each task. As shown in the example 300 of FIG. 3, there has been found herein a significant difference between the RM means of different categories. This leads to a decrease in the stability of the training process, and even the so-called "Reward Hacking" phenomenon, such as not saying what should be said, and over-outputting what should not be said.

Therefore, embodiments may, within the context of the example 200 of FIG. 2, may directly train a model to capture Advantage (advantage) where an advantage A(s, a) is obtained by determining Q(s, a)−V(s), where s represents the state, a represents the action, Q(s, a) represents the expected reward of taking action a in state s, and V(s) represents the expected reward in state s.

Within the RLHF pipeline 202 of FIG. 2, an RM may be trained on a dataset of comparisons between several model outputs on the same input. Embodiments present labelers with K model outputs to rank. Embodiments produces $$\binom{K}{2}$$

comparisons for each question shown to the annotators. After collecting all annotated data, they train on all $$\binom{K}{2}$$

comparisons from each question as a single GPU-batch element. Specifically, the loss function for the reward model may be:

$$L = -\frac{1}{\binom{K}{2}} E_{(x,y_c,y_r)\sim D}[\log(\sigma(r_\theta(x, y_c) - r_\theta(x, y_r)))] \qquad \text{Eq. (1)}$$

where $r_\theta(x, y)$ is the scalar output of the model 212 for question x and model output y with parameter $\theta$, $y_c$ is the preferred output over $y_r$ and D is the dataset of human comparisons.

In a next step, the initial model M, initial LLM 210 in FIG. 2, may be finetuned using a PPO algorithm. For example, a bandit environment may adopted which presents a random question and model output to score just one time. Given the question and model output, the model 212 produces a reward and ends the episode. In addition, a per-token KL penalty from the initial model may be added at each token to mitigate over-optimization of the RM:

$$\text{objective}(\phi) = E_{x\sim D_{PPO}}\left[r_\theta(x, y) - \beta\log\left(\frac{\pi(y \mid x)}{\pi^{init}(y \mid x)}\right)\right] \qquad \text{Eq. (2)}$$

where $\pi$ is the learned RL policy and $\pi^{init}$ is the initial model. The KL coefficient $\beta$ serves as a regularizer to prevent the learned RL policy from being far away from the initial model.

Figure 3:
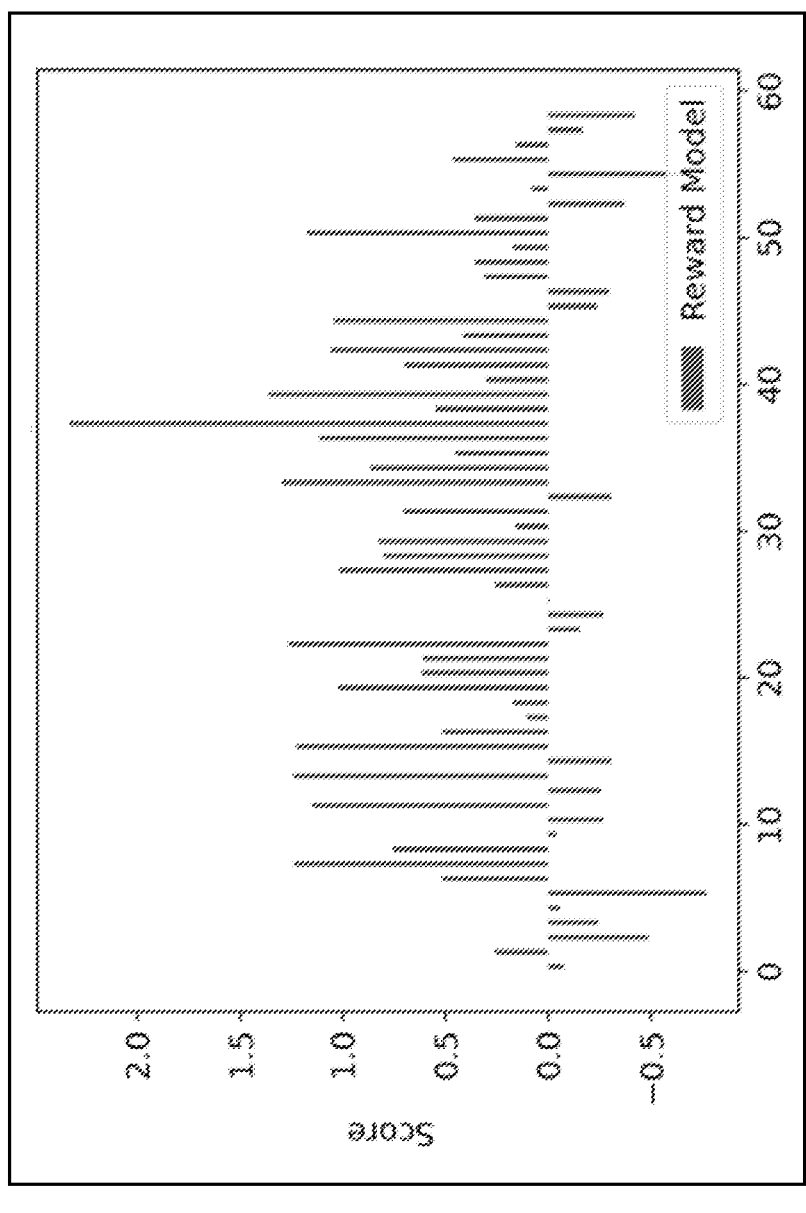
FIG. 3 is a simplified illustration in accordance with embodiments.

Embodiments herein solve "PPO Alignment Tax" problems where the model 212 results in significant difference in its scores between samples from different tasks as shown in FIG. 3 which otherwise leads to a decrease in the stability of the training process, and even the so-called "Reward Hacking" phenomenon, such as not saying what should be said, and over-outputting what should not be said.

Embodiments herein may alleviate the "PPO Alignment Tax" where the RM results in significant difference in its scores between samples from different tasks. Embodiments herein further provide two main modules which may be considered advantage modeling with entropy regularizer and adaptive FTX.

According to exemplary embodiments such as regarding advantage modeling, as model 212, with entropy regularizer, the loss function for the model 212 instead may be modeled by advantage as:

$$L = -\log(\sigma(a_\theta(x, y_c) - a_\theta(x, y_r))) -$$

$$\sum_{y \in p(x)} \log(|r_\theta(x, y) - E[r_\theta(x, y)]| - m(x))$$

Eq. (3)

where the first term $-\log(\sigma(a_\theta(x, y_c) - a_\theta(x, y_r)))$ is the same as RM training described above in FIG. 2, and the later term models the average model performance for input question x, such as from the query 201 or prompts 230

During PPO training, embodiments may directly use the advantage score as the RM score $r_\theta(x, y)$ minus the average model performance for input question x. Besides, embodiments may also add entropy score for the model output y as additional reward as:

$$a_\theta(x, y) = r_\theta(x, y) - E[r_\theta(x, y)] + \text{Entropy}(y)$$

Eq. (4)

Figure 4:
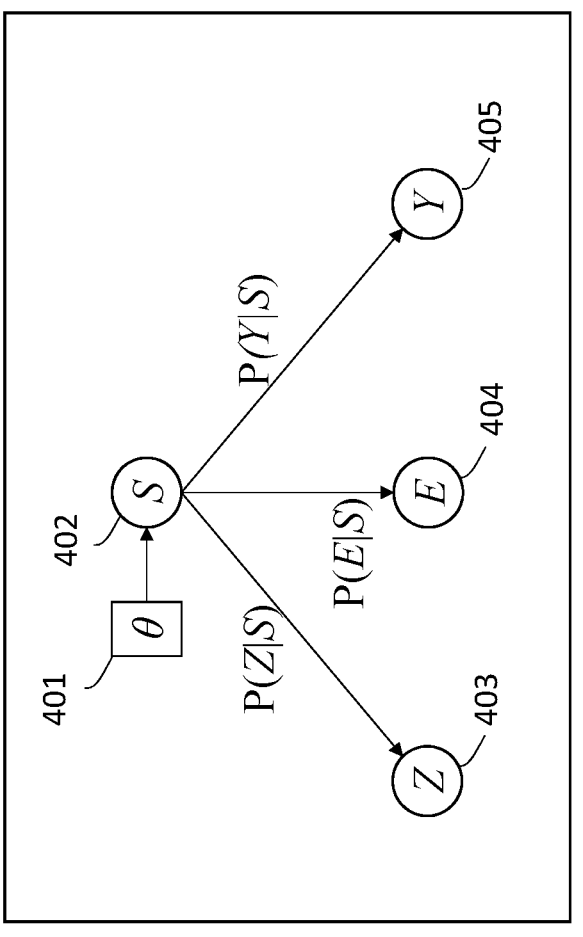
FIG. 4 is a simplified illustration in accordance with embodiments.

Further, regarding adaptive FTX, embodiments provide the design and use of a multi-gaussian mixed matrix (GMM) model 400 as shown in FIG. 4 which includes a generative model where each slice S 402 is firstly sampled from a distribution θ 401, and next the corresponding sentence embedding Z 403, entropy from the main policy E 404 and the RM score Y 405 are sampled based on S 402, each is based on a separate gaussian distribution. The overall generation story may be:

$$p(S \mid \theta) \cdot p(Z \mid S) \cdot p(E \mid S)^{\lambda_1} \cdot p(Y \mid S)^{\lambda_2}$$

Eq. 5 where $\lambda_1$ and $\lambda_2$ are the coefficients to control the importance of p(E|S) and p(Y|S) respectively.

Once all slices are obtained, embodiments obtain ones of the (question, answer) pairs, which according to exemplar embodiments may be added as the query 201, answer 203 and/or as ones of the comparison data 220 and prompts 230 as in FIG. 2, from those slices that are hard for the PPO algorithm to learn such as depending on a predetermined threshold and/or user selection. According to exemplary embodiments the new objective for our PPO-AdaptiveFTX training may is implemented, and used in the RLFH pipeline 202, as:

$$\text{objective}(\phi) =$$
$$E_{x \sim D_{PPO}} \left[ a_\theta(x, y) - \beta \log\left(\frac{\pi(y \mid x)}{\pi^{init}(y \mid x)}\right) \right] + E_{u \sim D_{FTX}} [\log(\pi(u))]$$

Eq. (6)

Figure 5:
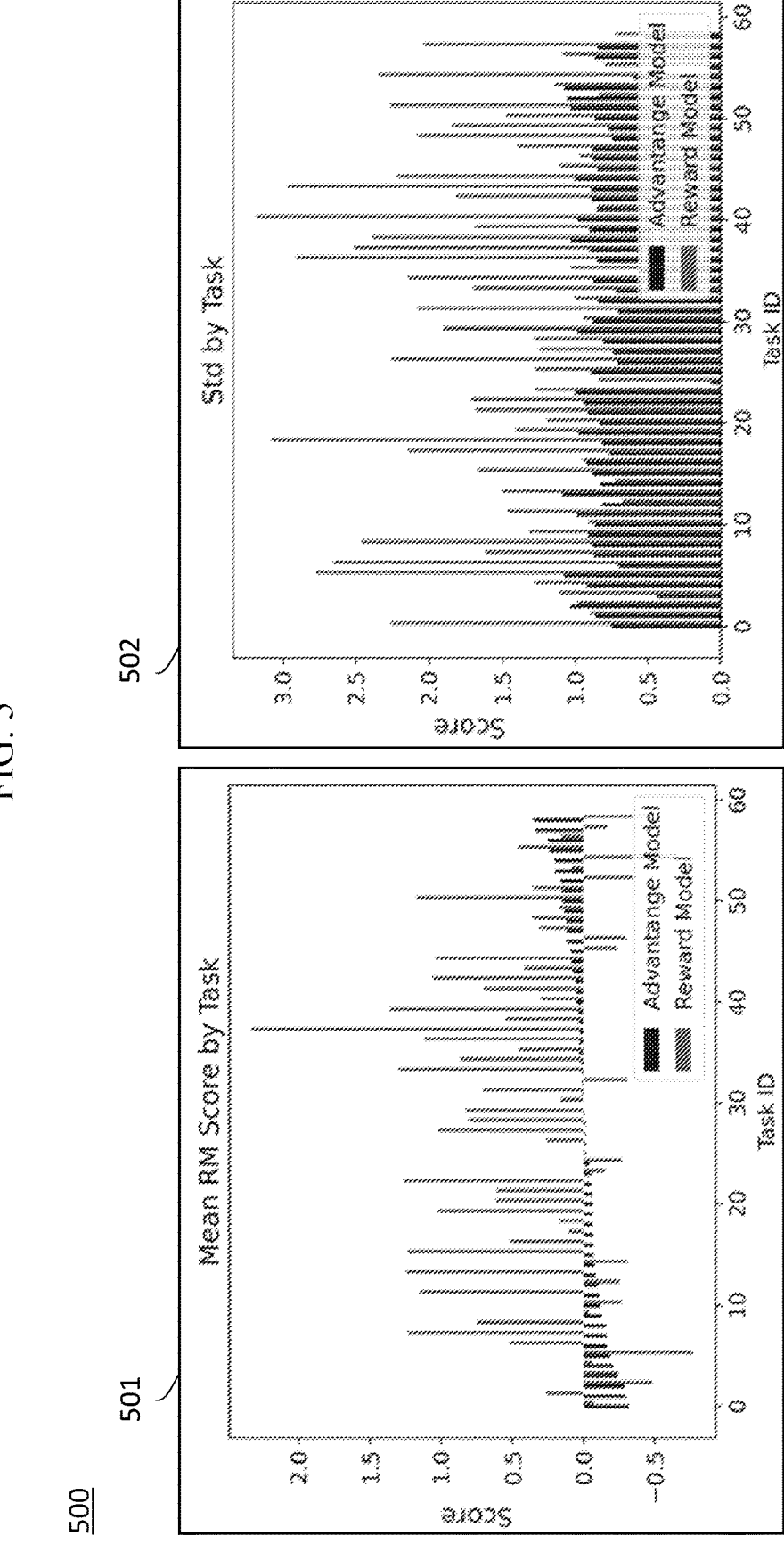
FIG. 5 is a simplified illustration in accordance with embodiments.

Advantages of such approach are shown from the following comparative data 500, including a mean RM score by task comparison 501 and a standard deviation (Std) by Task comparison 502 of FIG. 5 where, use of advantage model scores are found to be much more stable than the RM scores without across multiple subtasks. In particular, the mean values of using advantage model features at model 202 are closer to zero and has less variations. The comparative data 500 represents accuracy on a human annotated A/B test set and may overall be illustrated by the following Table 1

TABLE 1

|  | A/B Test |
| --- | --- |
| RM | 74.93 |
| AM | 75.28 |

Further, as shown in Table 2, a PPO trained policy with advantage model has higher win rate than the other policy trained with RM.

TABLE 2

|  | Win | Loss |
| --- | --- | --- |
| PPO w/AM vs RM | 54.2 | 45.8 |

As such, technical deficiencies involved in LLM GPT may be alleviated by embodiments herein which, as shown above, address the significant difference between a reward model (RM) means of different categories, decrease in stability of a training process, and reward-hacking phenomenon.

The techniques described above, can be implemented as computer software using computer-readable instructions and physically stored in one or more computer-readable media or by a specifically configured one or more hardware processors. For example, FIG. 15 shows a computer system 600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 600.

Computer system 600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610, joystick 605, microphone 606, scanner 608, camera 607.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, or joystick 605, but there can also be tactile feedback devices that do not serve as input devices), audio output devices (such as: speakers 609, headphones (not depicted)), visual output devices (such as screens 610 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 600 can also include human accessible storage devices and their associated media such as optical media including CD/DVD ROM/RW 620 with CD/DVD 611 or the like media, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 600 can also include interface 699 to one or more communication networks 698. Networks 698 can for example be wireless, wireline, optical. Networks 698 can further be local, wide-area, metropolitan, vehicular and industrial, real-time, delay-tolerant, and so on. Examples of networks 698 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 698 commonly require external network interface adapters that attached to certain general-purpose data ports or peripheral buses (650 and 651) (such as, for example USB ports of the computer system 600; others are commonly integrated into the core of the computer system 600 by attachment to a system bus as described below (for example Ethernet interface into a PC computer system or cellular network interface into a smartphone computer system). Using any of these networks 698, computer system 600 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 640 of the computer system 600.

The core 640 can include one or more Central Processing Units (CPU) 641, Graphics Processing Units (GPU) 642, a graphics adapter 617, specialized programmable processing units in the form of Field Programmable Gate Areas (FPGA) 643, hardware accelerators for certain tasks 644, and so forth. These devices, along with Read-only memory (ROM) 645, Random-access memory 646, internal mass storage such as internal non-user accessible hard drives, SSDs, and the like 647, may be connected through a system bus 648. In some computer systems, the system bus 648 can be accessible in the form of one or more physical plugs to enable extensions by additional CPUs, GPU, and the like. The peripheral devices can be attached either directly to the core's system bus 648, or through a peripheral bus 649. Architectures for a peripheral bus include PCI, USB, and the like.

CPUs 641, GPUs 642, FPGAs 643, and accelerators 644 can execute certain instructions that, in combination, can make up the aforementioned computer code. That computer code can be stored in ROM 645 or RAM 646. Transitional data can be also be stored in RAM 646, whereas permanent data can be stored for example, in the internal mass storage 647. Fast storage and retrieval to any of the memory devices can be enabled through the use of cache memory, that can be closely associated with one or more CPU 641, GPU 642, mass storage 647, ROM 645, RAM 646, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 600, and specifically the core 640 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 640 that are of non-transitory nature, such as core-internal mass storage 647 or ROM 645. The software implementing various embodiments of the present disclosure can be stored in such devices and executed by core 640. A computer-readable medium can include one or more memory devices or chips, according to particular needs. The software can cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system can provide functionality as a result of logic hardwired or otherwise embodied in a circuit (for example: accelerator 644), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for a large language model (LLM), the method performed by at least one processor and comprising:
receiving an input question to the LLM;
modeling an advantage for the input question based on at least one of a multi-gaussian mixed matrix (GMM) model and an entropy regularizer; and
training the LLM based on the advantage, wherein the advantage comprises a proximal policy optimization (PPO) objective where modeling the advantage is based on the multi-GMM model, and wherein the advantage comprises a combination of an output of a reward model (RM) and an average model performance for the input question where modeling the advantage is based on the entropy regularizer, and the combination of the output of the RM and the average model performance comprises a reduction of the output of the RM by the average model performance.

2. The method according to claim 1,
wherein the output of the reward model comprises $-\log(\sigma(a_\theta(x, y_c)-a_\theta(x, y_r)))$ where a is an action, $a_\theta(x, y)$ is an output of the RM for question x which is the input question, and y is a model output with parameter $\theta$, and $y_c$ is an output based on another output $y_r$.

3. The method according to claim 2,
wherein the average model performance is an average model performance for the question x.

4. The method according to claim 2,
wherein the combination further comprises, as the entropy regularizer, an entropy of the model output y as a reward to the reduction.

5. The method according to claim 2,
wherein the parameter $\theta$ represents a distribution from which a sample is taken in the multi-GMM model.

6. The method according to claim 1, wherein the PPO objective is based on question and answer pairs, wherein at least one of the question and answer pairs comprises the input question.

7. The method according to claim 6, wherein the multi-GMM model comprises sampling a distribution, a sentence embedding, and entropy each based on separate Gaussian distributions.

8. The method according to claim 6, wherein the multi-GMM model sets importance of the entropy.

9. The method according to claim 6, wherein the multi-GMM model samples the distribution, the sentence embedding, and the entropy in order of the distribution, then the sentence embedding, and then the entropy.

10. An apparatus for a large language model (LLM), the apparatus comprising:
at least one memory configured to store computer program code;
at least one processor configured to access the computer program code and operate as instructed by the computer program code, the computer program code including:
receiving code configured to cause the at least one hardware processor to receive an input question to the LLM;
modeling code configured to cause the at least one hardware processor to model an advantage for the input question based on at least one of a multi-gaussian mixed matrix (GMM) model and an entropy regularizer; and
training code configured to cause the at least one hardware processor to train the LLM based on the advantage, wherein the advantage comprises a proximal policy optimization (PPO) objective where modeling the advantage is based on the multi-GMM model, and wherein the advantage comprises a combination of an output of a reward model (RM) and an average model performance for the input question where modeling the advantage is based on the entropy regularizer, and the combination of the output of the RM and the average model performance comprises a reduction of the output of the RM by the average model performance.

11. The apparatus according to claim 10,
wherein the output of the reward model comprises $-\log(\sigma(a_\theta(x, y_c)-a_\theta(x, y_r))$ where a is an action, $a_\theta(x, y)$ is an output of the RM for question x which is the input question, and y is a model output with parameter $\theta$, and $y_c$ is an output based on another output $y_r$.

12. The apparatus according to claim 11,
wherein the average model performance is an average model performance for the question x.

13. The apparatus according to claim 11,
wherein the combination further comprises, as the entropy regularizer, an entropy of the model output y as a reward to the reduction.

14. The apparatus according to claim 11,
wherein the parameter $\theta$ represents a distribution from which a sample is taken in the multi-GMM model.

15. The apparatus according to claim 10, wherein the PPO objective is based on question and answer pairs, wherein at least one of the question and answer pairs comprises the input question.

16. The apparatus according to claim 15, wherein the multi-GMM model comprises sampling a distribution, a sentence embedding, and entropy each based on separate Gaussian distributions.

17. The apparatus according to claim 15, wherein the multi-GMM model sets importance of the entropy.

18. A non-transitory computer readable medium storing a program causing a computer to:
receive an input question to the LLM;
model an advantage for the input question based on at least one of a multi-gaussian mixed matrix (GMM) model and an entropy regularizer; and
train the LLM based on the advantage, wherein the advantage comprises a proximal policy optimization (PPO) objective where modeling the advantage is based on the multi-GMM model, and wherein the advantage comprises a combination of an output of a reward model (RM) and an average model performance for the input question where modeling the advantage is based on the entropy regularizer, and the combination of the output of the RM and the average model performance comprises a reduction of the output of the RM by the average model performance.

\* \* \* \* \*